Patented May 15, 1945

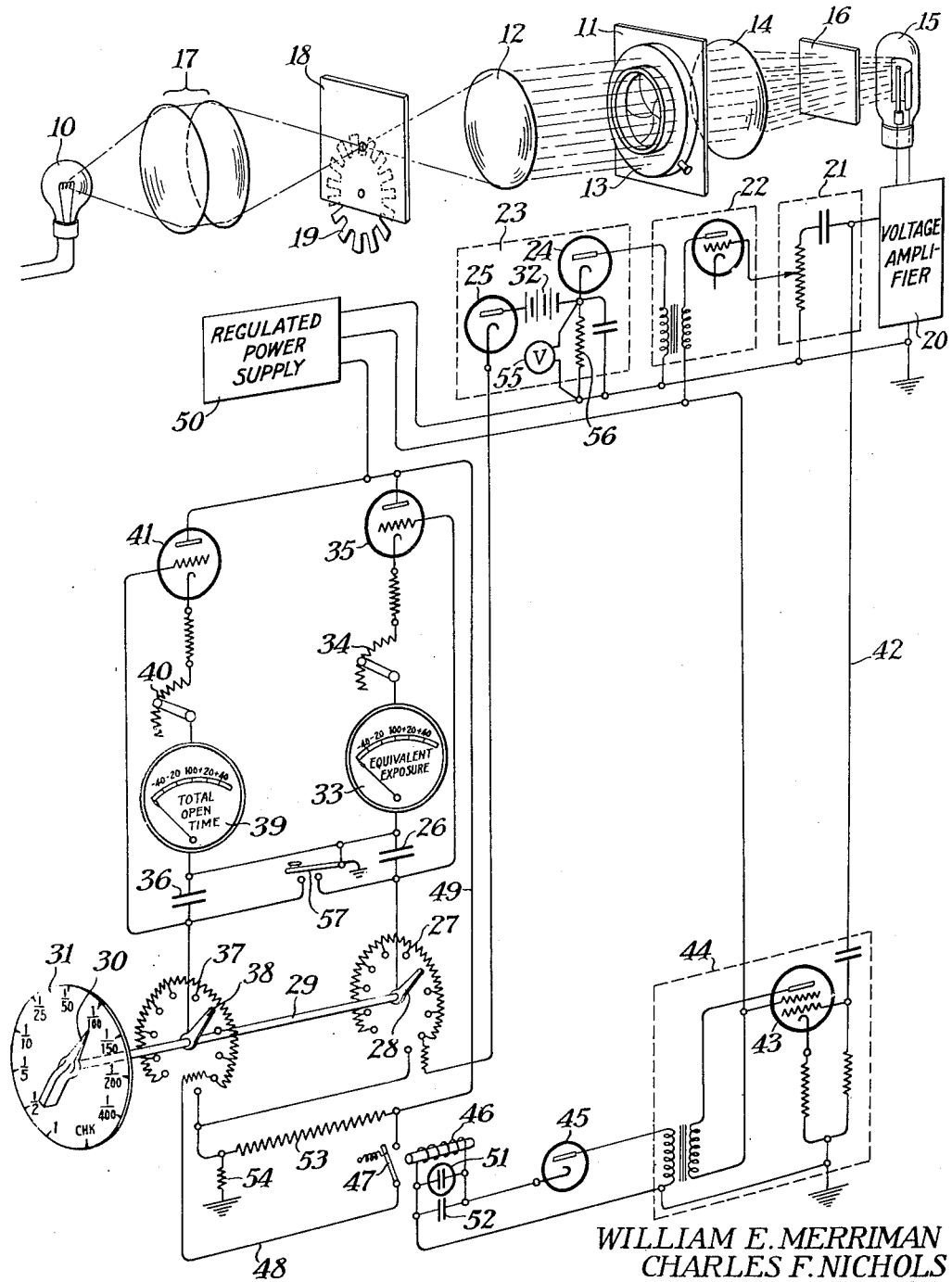

2,376,162

UNITED STATES PATENT OFFICE 2,376,162

PHOTOGRAPHIC SHUTTER TESTER

William E. Merriman and Charles F. Nichols, Rochester, N. Y., assignors to Eastman Kodak Company, Rochester, N. Y., a corporation of New Jersey Application March 5, 1941, Serial No. 381,870

5 Claims. (Cl. 88—14)

This invention relates to a method and apparatus for measuring short intervals of time and the operating characteristics of devices furnishing the short time intervals. More particularly, the invention relates to the testing of photographic shutters either in absolute values or in terms of percentage variation from the performance indicated by the shutter setting markings.

It is an object of the invention to provide an arrangement making possible rapid testing of shutter performance with extreme accuracy and with a minimum of adjustments.

Another object of the invention is the provision of means whereby the operating characteristics or performance of a shutter can readily be checked against the expected or indicated performance.

Another object of the invention is the provision of means whereby different shutters may be tested with the same accuracy throughout a wide range of indicated settings and their performance measured or evaluated in terms of departure from the performance indicated by the different settings.

It is well known that when a photographic shutter is operated for making an exposure, the shutter opens, remains open for a short interval of time and then closes. The total open time of a shutter is the time interval between the instant the blades start to open and the instant the blades are closed, i. e., the period of time the shutter is in light transmitting condition. The equivalent exposure time or average open time of a shutter is the time required by a perfect shutter to give the same exposure as the shutter under test, a perfect shutter being one requiring no time to open or to close.

From the photographic standpoint, the two important features of the operation of a shutter are the total amount of light transmitted (exposure) and the total length of time light is transmitted (object movement stopping). Therefore, as a practical test of the performance of a shutter, it is sufficient to check the extent its actual performance differs from the performance indicated by the speed markings provided on the shutter.

In accordance with the present invention in its preferred form the system is adapted to test shutters in terms of percentage difference between actual performance and indicated performance. These terms are a question of calibration which may be changed if it is desired to check the shutters in other terms, such as actual time values, efficiencies or the like. A discussion of the several factors involved in shutter performance will be found in Patent No. 2,168,994, which issued to J. D. Kelly, August 8, 1939.

The invention will be clearly understood from the following description when read in connection with the accompanying drawing and its scope will be pointed out in the appended claims.

A single figure in the drawing shows diagrammatically the preferred arrangement for practicing the invention in which both the equivalent exposure and the total time of exposure are indicated in terms of percentage variation from the indicated time interval marked on the shutter being tested.

According to the embodiment shown in the drawing, a light beam is established by a suitable source 10 and directed to a shutter test board 11 by a suitable lens 12. A shutter 13 to be tested when arranged on the test board 11 and opened allows light to be transmitted to a lens 14 which directs the transmitted light onto a light-sensitive cell 15. If desired, a sheet of diffusing material 16 may be positioned between the lens 14 and the cell 15 to bring about more even illumination of the light-sensitive surface of the cell 15. The lens 12 is so constructed and positioned that the light beam transmitted to the test board 11 is large enough in cross-section to more than equal the maximum opening of any shutter 13 to be tested and the light is uniformly distributed throughout this cross-section. In order that the output of the cell 15 may readily be converted into alternating current, the light beam is suitably modulated at a high frequency which may be done by modulating the light source 10 or, as shown in the drawing, by concentrating the light as by lenses 17 onto an apertured plate 18 with which is associated an ordinary light chopper 19 which is rotated at the desired speed by suitable means not shown.

When the shutter 13 transmits light, the pulsating current delivered by the cell 15 is fed to a voltage amplifier 20 and appears at the output of this amplifier as an alternating voltage. The alternating voltage output of the amplifier 20 is fed through a suitable adjustable gain control 21 to a power amplifier 22, the amplified output of which is fed to a rectifier unit 23 comprising two rectifier tubes 24 and 25, the first tube, 24, of which converts the alternating output to direct current, and the second tube, 25, of which feeds a direct current to the measuring network now to be described.

The timing circuits employ a series arrangement of a condenser and a resistance in a well-known manner for setting up definite time intervals when charged or discharged under predetermined conditions. In the present arrangement two such timing networks are employed, one of which functions for evaluating the equivalent exposure of a shutter being tested and the other of which evaluates the total open time of the tested shutter. For convenience these two systems will be described separately.

In the equivalent exposure evaluating network a condenser 26 is connected in series with a resistance 27 which is adapted to be adjusted to a number of different pre-selected values by a contact arm 28 carried by a shaft 29 to which is secured a control knob 30 with which is associated an index plate 31 bearing a series of time intervals which are to be tested and which correspond to the time intervals of the condenser 26 and resistance 27 as pre-selected by the adjustable arm 28. The rectifier 25 may be provided with a source of bucking potential 32 equal to the contact potential of the rectifier 25 so that no current flows except when a signal is present, i. e., when the shutter 13 being tested transmits light. The output of the rectifier 25 is connected to charge the condenser 26 through the resistance 27 and this charge is measured in any suitable manner as by a vacuum tube volt meter shown in the drawing as comprising a meter 33 and an adjustable resistance 34 connected in series with the grid circuit of a tube 35 across the condenser 26.

The total open time network includes a condenser 36 having a series resistance 37 which is also adjusted by the knob 30 by means of a contact arm 38 carried by the shaft 29. The charge on the condenser 36 may be measured by means of a meter 39 connected in series with an adjustable resistance 40 and the grid circuit of a tube 41 across the condenser 36. The condenser 36 is adapted to be charged through the resistance 37 whenever the shutter 13 under test transmits light. This is accomplished by the circuit arrangement now to be described. Whenever the cell 15 is energized, the output of the voltage amplifier 20 is supplied through a lead 42 to the grid of a tube 43 in a power amplifier 44. The output of the amplifier 44 is fed through a rectifier 45 to a relay 46 which, when energized, attracts its armature 47 to complete a circuit from the resistance 37 through leads 48 and 49 to a source of constant potential which may may be furnished by a suitable regulated power supply 50. The relay 46 is preferably shunted by a suitable glow tube 51 for limiting the potential applied to the relay 46 and may also be shunted by a condenser 52 for smoothing its operation, as is well known. It is thus seen that whenever the cell 15 is energized the relay contact 47 is closed to connect the condenser 36 and associated resistance 37 to a source of constant potential which, in applicants' preferred embodiment, is 90 volts.

In addition to the time interval indications carried by the disk 31, there is a position CHK to which the knob 30 is moved for checking the calibration of the two meters. When moved to this checking position, the contacts 28 and 38 connect the condensers 26 and 36, respectively, to a source of low potential shown in the drawing as obtained from voltage dividing resistances 53 and 54 connected between the 90 volt supply and ground. The condensers 26 and 36 and their associated resistances 27 and 37 are so selected that, for any interval to be tested, the potential of the charge accumulated on these condensers does not exceed 10% of the potential of the charging current so as to insure that the charging rate is linear.

In the particular arrangement illustrated the condensers 26 and 36 each have a capacity of 4 mfd. and the checking voltage provided by the voltage dividing resistances 53 and 54 is 4½ volts. The charging potential for the condenser 36 through the resistance 37 is 90 volts. The charging potential for the condenser 26 through its resistance 27 depends upon the energization of the cell 15, but, for the reasons appearing hereafter, the maximum charging potential is selected at a predetermined value, which, in the present apparatus, is 50 volts. This charging potential is of course regulated by means of the adjustable resistance in the gain control 21, although it may be regulated in any suitable manner as by varying the intensity of the light falling on the shutter test board 11 or otherwise as desired.

The manner in which the several parts function will be better understood from the following description of overall operation of the system. With the shutter 13 to be tested in position on the board 11 and with the shutter blades closed so that no light is transmitted, the timing knob 30 is moved to the checking position labeled CHK, the equivalent exposure meter 33 and the total open time meter 39 are checked and, if necessary, their cooperating resistances 34 and 40, respectively, are adjusted so that both the meters 33 and 39 read 100. The shutter 13 is now opened to its maximum opening which may be the maximum opening of the shutter itself or a maximum opening as determined by a fixed diaphragm for which it is desired to test the shutter. With the shutter thus in maximum light transmitting position, the system is adjusted by means of the gain control 21 so that the power amplifier 22 will deliver a predetermined power which may conveniently be checked by means of a suitable volt meter 55 connected across a load resistor 56 in the output circuit of the amplifier 22. As was pointed out above, applicants' particular apparatus is designed to operate with a maximum potential of 50 volts across this load resistor 56. Therefore, the gain control 21 is adjusted until the volt meter 55 indicates 50 volts. Instead of having a separate volt meter 55 for this purpose, it is of course possible to arrange for switching one of the meters 33 or 39 to make this reading.

The blades of the shutter 13 are now closed and the timing knob 30 is set to the shutter speed at which the shutter 13 is to be operated. Immediately prior to operating the shutter 13 at the speed to be tested, the condensers 26 and 36 are completely discharged as by closing a switch 57. The shutter 13 is tripped immediately and the readings of the two meters 33 and 39 are noted as soon as they become stabilized. The reading of the meter 33 indicates the percent variation of the equivalent exposure from the exposure indicated by the shutter setting and the meter 39 indicates the percent variation of the shutter's total open time from the indicated time of the shutter setting. These two readings are to give the operator the desired practical information as to the performance of the shutter under test, and, if other information is desired, such as the efficiency of the shutter, it may be obtained by dividing the reading of the equivalent exposure meter 33 by the reading of the total time meter 39. That these readings are accurate will be clear from a consideration of what happened in the system when the shutter 13 was actuated for its indicated time interval as, for instance, 1/100 sec. By test it is known that, when the condensers 26 and 36 are charged to 4.5 volts, their corresponding meters 33 and 39 will read 100. By design it is known that, when the resistance 27 is adjusted to the 1/100 position, the application of 50 volts for exactly 1/100 sec. will charge the condenser to 4.5 volts and that, when the resistance 37 is set at the 1/100 position, the application of 90 volts for 1/100 second will charge the condenser 36 to exactly 4.5 volts. Therefore, if the shutter 13 was perfect and operated at 1/100 sec., both the condensers 26 and 36 would be charged to 4.5 volts and their meters would read 100. This, for the reason that the instant the shutter 13 opened light would fall on the cell 15 to cause a current to appear in the output of the voltage amplifier 20. This output is immediately impressed upon the power amplifier 44 through the lead 42 and the relay closes its contact 47 to impress 90 volts across the resistance 37 in series with the condenser 36. The instant the shutter 13 closed the light was shut off from the cell 15 and the power amplifier 44 being no longer energized, the relay contact 47 opened to discontinue charging the condenser 36. If this interval was exactly 1/100 sec. the charge on the condenser 36 would be 4.5 volts and its meter 39 would read exactly 100. Any variation in this charging interval would result in a smaller or greater charge on the condenser 36 with a corresponding variation in the reading of the meter 39 and, due to its calibration, this meter 39 would read such variations in terms of the percentage of the correct time.

When the shutter 13 was operated as above described, the output of the cell 15 appeared in amplified form across the load resistor 56 and, by reason of previous adjustment, the potential across this resistor 56 is 50 volts during the entire time that the shutter 13 is at maximum opening. This potential charges the condenser 26 and if, as assumed above, the shutter is perfect, it would be at maximum opening throughout its time interval and, accordingly, the condenser would be charged to 4.5 volts and the meter 33 would indicate an equivalent exposure of 100%. Inasmuch as the shutter 13 is not perfect, it requires some time to open and some time to close and, therefore, during the opening and closing periods, the charging potential is not 50 volts, but is some lesser voltage which varies directly with the energization of the cell 15 and is, therefore, a direct function of the area of the shutter at any instant. It is thus clear that the total charge accumulated on the condenser 26 is a measure of the average open time of the shutter, or stated differently, is a measure of the equivalent exposure time of the shutter 13 and the amount this charge falls short of or exceeds 4.5 volts is a direct measure of the variation of the exposure given by the shutter from the exposure indicated by its speed setting.

It might be pointed out that the volt meter tubes 35 and 41, preferably high mu triodes, are so selected that full scale deflections on their associated meters represent a current through these tubes which approaches the maximum value possible.

If it is desired to employ the apparatus to test a focal plane shutter, all that is necessary is to position at the shutter board 11 a slit smaller in width than the smallest slit width in the shutter to be tested. With this slit in position the gain control 21 is adjusted to provide 50 volts across the load resistor 56 after which the shutter is inserted in position and operated at the speed to be tested. The time interval knob 30 is adjusted to this speed and when the shutter is operated, the meter 33 will indicate the equivalent exposure given by the shutter. If desired, the total open time of a focal plane shutter may be checked by removing the slit from the shutter board 11 and operating the shutter. This reading will, of course, appear on the meter 39 as a percentage relation between the actual total time and the open time expected from the shutter.

While, for the purpose of illustrating the invention, a specific embodiment thereof has been described in detail, it is to be understood that the invention may be incorporated in many different embodiments and that the appended claims are intended to include within their scope all of the various embodiments which would occur to anyone skilled in this art.

What we claim as new and desire to secure by Letters Patent of the United States is:

1. A system for testing the accuracy of the indicated time interval of a photographic shutter comprising means for supplying energy at a constant rate, energy storage means adapted to be connected to the energy supplying means, means for adjusting the rate at which said storage means receives energy to a value sufficient to cause a given quantity of energy to be stored when the storage means is connected to the energy supply for any indicated time interval of a perfect shutter, means for connecting the storage means to the energy supply throughout the actual time interval the shutter being tested is open during a single operation, and means for indicating the discrepancy between the quantity of energy stored during the operation of a shutter at an indicated time interval and said given quantity of energy and translating it into terms of inaccuracies.

2. The method of comparing the performance of a photographic shutter with the performance indicated by the time interval setting at which it is operated which comprises setting up a condenser and a series resistance combination which can be adjusted so that a standard charge will be accumulated by the condenser when the condenser and resistance are connected to a predetermined potential for any indicated time interval, adjusting said combination in accordance with a given indicated time interval, operating the shutter at said indicated interval, impressing said predetermined potential upon the condenser and its series resistance throughout the interval the shutter is in light transmitting condition, measuring the charge accumulated by the condenser, and noting the difference between the accumulated charge and said standard charge.

3. A system for testing the accuracy of the time interval indication of a photographic shutter comprising a condenser, a circuit for charging the condenser at a rate known to result in a standard charge thereon when continued for the time interval indicated by the shutter setting, said circuit including a source of constant potential, and an adjustable resistance in series with said condenser by adjustment of which the standard charge can be made the same for any indicated time interval means for completing the charging circuit throughout the period the shutter is in light transmitting condition during one operation of the shutter, and means for measuring the charge accumulated by the condenser, said means including a scale for indicating the difference between the standard charge and the charge supplied during one interval of operation of the shutter.

4. A system for evaluating the equivalent exposure time of a photographic shutter in terms of percentage of its indicated exposure time comprising photoelectric means adapted to be energized by light passing through the shutter, the output of which photoelectric means is proportional to two variable elements, one of which is the area of the shutter, means for varying the other of the two elements to bring said output to a given value when said shutter is at its maximum opening, electrical quantity reading means adjustable to read a standard amount when supplied at said given value for the indicated exposure time, means for connecting the reading means to the photoelectric means, and a scale on the reading means for indicating the difference between said standard amount and the quantity supplied by said photoelectric means during one interval of operation of the shutter.

5. The method of comparing the performance of a photographic shutter with the performance indicated by the time interval setting at which it is operated which comprises setting up a first condenser and series resistance combination of such value that a standard charge will be accumulated by the condenser when it is supplied with a predetermined potential for the interval indicated, setting up a second condenser and series resistance combination of such value that a standard charge will be accumulated by the condenser when it is supplied with a given potential generated by a photoelectric means when energized by light passing through the shutter at maximum opening for the indicated time interval, operating the shutter while set at the indicated interval, utilizing the activation of said photoelectric means to cause the first condenser and series resistance combination to be supplied with said predetermined potential throughout the actual time interval the shutter is open during a single operation, simultaneously supplying a potential to the second condenser and series resistance combination which varies in accordance with variations in the shutter aperture during one operation of the shutter, measuring the charge accumulated by each condenser, noting the difference between the charge accumulated by each condenser and said standard charges, and determining the ratio of the charges accumulated by the condensers to obtain the efficiency of the shutter.

WILLIAM E. MERRIMAN.
CHARLES F. NICHOLS.